Oct. 12, 1926.                                                   1,603,064
                        C. C. CARPENTER
              METHOD OF MANUFACTURING BATTERY PLATES
                        Filed Jan. 19, 1921
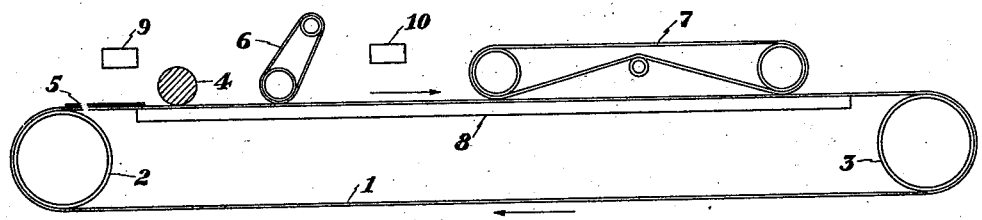
                                                        INVENTOR.
                                              Campbell C. Carpenter
                                           BY
                                                        ATTORNEYS.

Patented Oct. 12, 1926.

1,603,064

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

METHOD OF MANUFACTURING BATTERY PLATES.

Application filed January 19, 1921. Serial No. 438,521.

The present invention relates to methods of manufacturing battery plates.

In the manufacture of storage battery plates of the Faure type, material constituting the active material is pasted into grids to form the plates. Said active material, which is commonly called "paste", may be applied to the grids by hand or by machinery. The paste is applied in moist condition and the resulting plates may be damp.

An object of the present invention is to provide a method of pasting battery plates having the advantage that plates pasted by said method may be safely stacked one upon another, when in damp condition.

A further object is to provide a method which will produce a plate having high capacity on initial discharges.

Further objects will appear as the description proceeds.

The one figure of the drawing represents schematically a machine for pasting battery plates, said machine being shown for the purpose of illustrating the practice of the present invention. The invention is not limited to practice with this machine, however, or to any machine, being equally applicable to the hand pasting of battery plates.

In the drawing, the numeral 1 refers to an endless belt mounted upon two drums 2 and 3. Said belt 1 may be power driven in the direction of the arrow. Mounted above said belt 1 is a device 4 for applying paste to the grids, one of which is represented by the numeral 5. The grid 5 will be carried by the belt 1 in a direction from left to right, as viewed in the drawing, and will pass in succession under the belt 6, which has the function of packing the paste into the grid, and the belt 7, which has the function of finishing the upper surface of the paste. The lower surface of the paste may be finished by the belt 1. An abutment 8 may be provided within the belt 1 for taking the pressure exerted against the belt 1 by the members 4, 6 and 7.

The numerals 9 and 10 represent sifters for sifting an inert substance upon the belt 1 and upon the upper surface of the paste in the grids. The substance delivered by the sifters 9 and 10 may be calcined magnesium oxide, or other inert substance. Preferably, though not necessarily, said substance should be soluble in battery electrolyte. The sifter 9 will be located to the left of device 4 and will sift inert material upon the belt 1. The fact that part of said inert material will pass through the grids 5, will do no harm. Sifter 10 will deliver inert material upon the top side of the paste in the grids after said paste has been packed into the grids, but before the upper surface of said paste is finished by the belt 7. The inert material will be pressed into the paste on both the upper and lower surfaces thereof and will effectually prevent the sticking together of plates when said plates are stacked one upon another. Moreover, due to the fact that the inert material is pressed into the surface of the active material and is dissolved out as soon as the plate is subjected to electrolyte, the superficial area of the plate is increased, resulting in high capacity on initial discharges.

In the hand pasting of battery plates, the inert material will be applied to freshly pasted plates and may be forced into the surface or not, as preferred.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent of the United States is—

1. The method in the manufacture of battery plates of the pasted type which consists of applying an inert substance soluble in electrolyte to the surface of the paste on both sides of a freshly pasted plate.

2. The method in the manufacture of battery plates of the pasted type which consists of applying an inert substance soluble in battery electrolyte to the surface of the paste on both sides of a freshly pasted plate and forcing said material into said paste, thereby increasing the superficial area of said paste.

3. A battery plate of the pasted type having densely packed active material, the surfaces of which have co-mingled therewith an inert substance soluble in electrolyte.

In witness whereof, I have hereunto subscribed my name.

CAMPBELL C. CARPENTER.